United States Patent
Cannon et al.

(10) Patent No.: US 7,529,821 B1
(45) Date of Patent: May 5, 2009

(54) NETWORK ELEMENT MANAGEMENT

(75) Inventors: Wayne Cannon, Petaluma, CA (US); S. Daniel James, Herndon, VA (US); Sean Mountcastle, Herndon, VA (US); Anita Recharla, Herndon, VA (US); Rich Verjinski, Herndon, VA (US); Rudy Zulkarnain, Herndon, VA (US)

(73) Assignee: Cisco Technology, Inc., San Jose, CA (US)

( * ) Notice: Subject to any disclaimer, the term of this patent is extended or adjusted under 35 U.S.C. 154(b) by 361 days.

(21) Appl. No.: 10/060,926

(22) Filed: Jan. 29, 2002

(51) Int. Cl.
*G06F 15/173* (2006.01)
(52) U.S. Cl. ...................................................... 709/223
(58) Field of Classification Search ......... 709/220–223; 719/321
See application file for complete search history.

(56) References Cited

U.S. PATENT DOCUMENTS

| | | | | |
|---|---|---|---|---|
| 5,491,796 A | | 2/1996 | Wanderer et al. ...... 395/200.09 |
| 5,684,967 A | | 11/1997 | McKenna et al. ........... 395/329 |
| 5,961,595 A | * | 10/1999 | Kawagoe et al. ............ 709/223 |
| 6,122,639 A | * | 9/2000 | Babu et al. .............. 707/103 R |
| 6,163,817 A | | 12/2000 | Shteyn et al. .................. 710/8 |
| 6,178,468 B1 | * | 1/2001 | Rudd et al. .................. 717/175 |
| 6,260,062 B1 | * | 7/2001 | Davis et al. ................. 709/223 |
| 6,272,537 B1 | * | 8/2001 | Kekic et al. ................. 709/223 |
| 6,360,260 B1 | * | 3/2002 | Compliment et al. ....... 709/224 |
| 6,434,447 B1 | * | 8/2002 | Shteyn ....................... 700/245 |
| 6,473,783 B2 | * | 10/2002 | Goshey et al. .............. 709/203 |
| 6,549,943 B1 | * | 4/2003 | Spring ........................ 709/223 |
| 6,735,625 B1 | * | 5/2004 | Ponna ........................ 709/223 |
| 6,823,519 B1 | * | 11/2004 | Baird et al. ................. 719/313 |
| 6,833,787 B1 | * | 12/2004 | Levi ....................... 340/539.13 |
| 6,963,911 B2 | * | 11/2005 | Gebhardt Jr. et al. ........ 709/223 |
| 7,051,098 B2 | * | 5/2006 | Masters et al. .............. 709/224 |
| 7,139,823 B2 | * | 11/2006 | Benfield et al. ............. 709/224 |
| 7,146,568 B2 | * | 12/2006 | Richardson ................. 715/736 |
| 7,181,508 B1 | * | 2/2007 | Sretenovic ................. 709/220 |
| 7,216,157 B1 | * | 5/2007 | Liu et al. .................... 709/223 |
| 7,430,745 B2 | * | 9/2008 | Kato .......................... 719/327 |
| 2002/0032761 A1 | * | 3/2002 | Aoyagi et al. ............... 709/223 |
| 2002/0161883 A1 | * | 10/2002 | Matheny et al. ............. 709/224 |
| 2002/0174198 A1 | * | 11/2002 | Halter ........................ 709/220 |
| 2002/0174209 A1 | * | 11/2002 | Sesek et al. ................. 709/223 |
| 2003/0097425 A1 | * | 5/2003 | Chen ......................... 709/220 |

* cited by examiner

*Primary Examiner*—Douglas B Blair
(74) *Attorney, Agent, or Firm*—Cindy Kaplan

(57) ABSTRACT

Techniques for managing network elements in a network are provided. A network element dependent module is utilized to provide functions for managing a specific type of network element. The network element dependent module can be for a network element type and software version. The network element application can manage new network elements, even those with new features, without requiring an update to the network management application.

21 Claims, 8 Drawing Sheets

NETWORK ELEMENT MANAGEMENT

BACKGROUND OF THE INVENTION

The present invention relates to managing network elements in a network. More specifically, the invention relates to managing network elements utilizing a network element dependent module that includes functions for managing a specific type of network element.

As communication networks continue to improve, network elements (or devices) are being developed and sold that have an increasing number of new features. For example network elements can support higher bandwidths, new protocols, more ports, and the like. One of the problems that has plagued this industry is the difficulty of utilizing new network elements with new features in existing networks.

A network management application allows users to manage network elements in a network. One of the difficulties with designing a network management application is it is difficult, if not impossible, to foresee all the new features that will be available in future network elements. Therefore, as network elements become available with new features, the developer of the network management application typically has to release an update so that the network management application can manage and take advantage of the new features.

Although providing updates to the network management application for new features and new network elements can achieve satisfactory results, it has a number of major drawbacks. Initially, modifying an existing application is very inefficient and time consuming. Also, modifications to the application can introduce new bugs into the application. Still further, consumer confidence may be lowered when an application developer continually releases updates to their products.

Therefore, innovative techniques for managing network elements in a network are needed. It would be beneficial to provide techniques that allow new features and new network elements to be readily managed by a network management application.

SUMMARY OF THE INVENTION

The present invention provides innovative techniques for managing network elements in a network. In general, a network element (or NE) includes a network element dependent software module. The network element dependent software module can specify characteristics of the network element and include functions (e.g., in the form of computer code) for managing a specific type of network element. In other words, the network element dependent module can provide specifications and functions that are specific to the network element to which the network element dependent module is associated. The network management application can utilize network element independent modules for functions that are generic to the network element type, and network element dependent modules for functions that are specific to the network element type. In this manner, a new network element can be added to a network and readily managed by the network management application regardless of whether the network element includes new features or is a new network element. Some specific embodiments of the invention are described below.

In one embodiment, the invention provides a method of managing network elements in a network. A network element independent module is provided that includes functions for managing different types of network elements. A network element dependent module is provided that includes functions for managing a specific type of network element. A network management application calls the functions of the network element independent and dependent modules to manage multiple network elements in the network. In preferred embodiments, the functions of the network element dependent module are executable at run time through dynamic software loading.

In another embodiment, the invention provides a method of managing network elements in a network. A request is sent to a network element for a network element dependent module that includes functions for managing the specific type of the network element. The network element dependent module is executed to create an interface to the network element and the interface is utilized to manage the network element. Additionally, in some embodiments, if the specific type and software version of the network element are the same as a stored network element dependent module, the stored network element dependent module can be utilized.

Other features and advantages of the invention will become readily apparent upon review of the following description in association with the accompanying drawings, where the same or similar structures are designated with the same reference numerals.

DETAILED DESCRIPTION OF PREFERRED EMBODIMENTS

In the description that follows, the present invention will be described in reference to embodiments that manage network elements in a network through network element dependent modules. The network elements can include switches, routers, hubs, cross-connects, multiplexors (including Wave Division Multiplexing or WDM, Dense Wave Division Multiplexing or DWDM, Synchronized Optical Networks or SONET and Synchronized Digital Hierarchy or SDH), Storage Area Networks (SAN), and the like. However, embodiments to the invention are not limited to any particular environment, application or implementation. Therefore, the description of the embodiments that follows is for purposes of illustration and not limitation.

Figure 1:
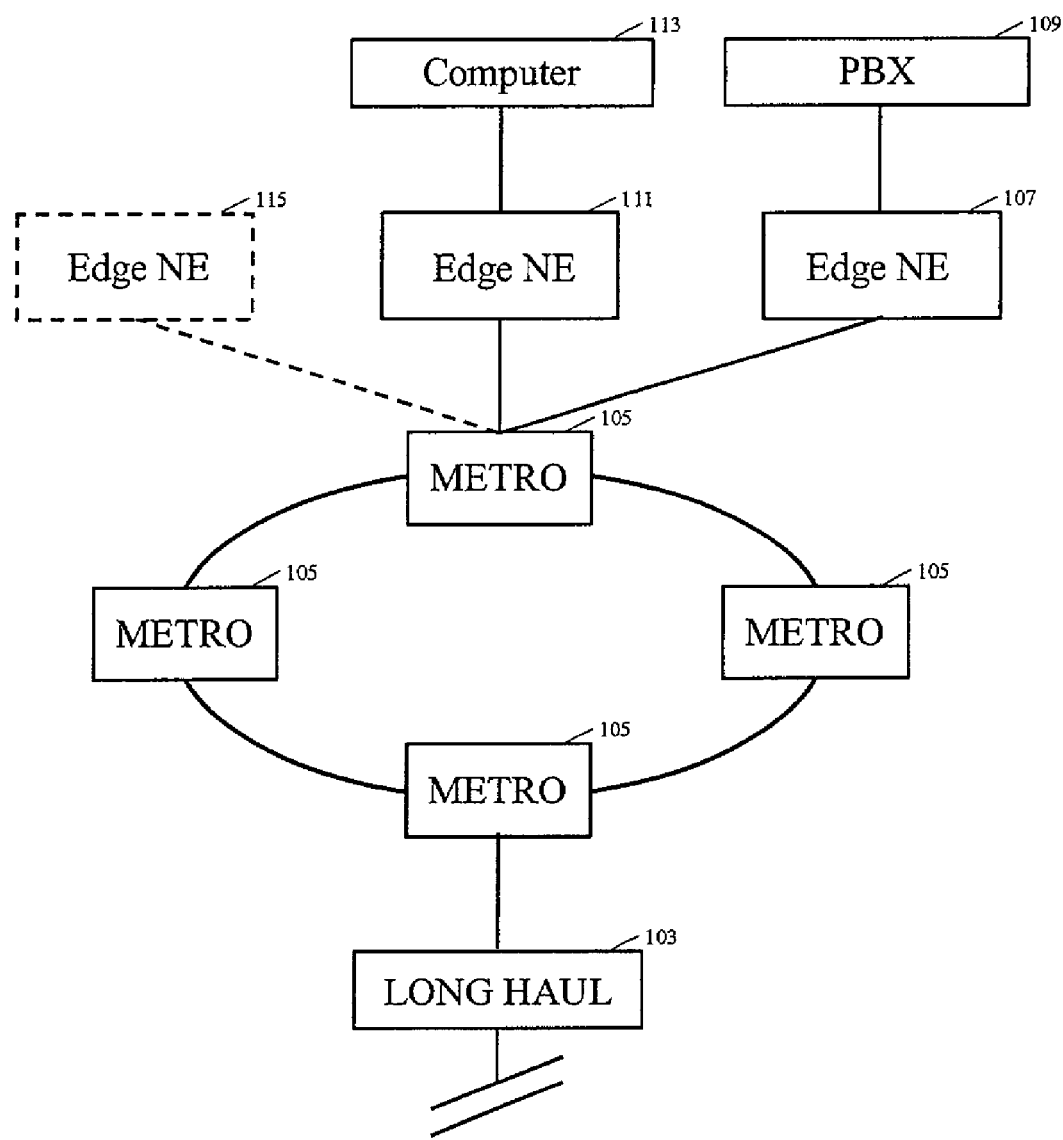
FIG. 1 shows an example of a network including multiple network elements (NE) both at in the metro network and on the edge of the network.

FIG. 1 shows an example of a network including multiple network elements and a network element that has been recently added to the network. The network shown is intended to illustrate an exemplary network that can utilize embodiments of the invention. However, the network does not show all the network elements that can benefit from the invention nor does it show a complete network, such as the wide area network of the Internet, to which the invention can be advantageously applied.

Network data can be communicated over long distances utilizing a long haul network element 103. As an example, long haul network element 103 can utilize DWDM and can operate at terabit per second speeds such as the Cisco ONS 15808 available from Cisco Systems Inc., San Jose, Calif. Within a metropolitan area, metro network elements 105 can transmit network data within a ring, such as a SONET ring. An example of a metro element 105 is the Cisco ONS 15454 available from Cisco Systems, Inc., San Jose, Calif.

An edge device (such as a switch) 107 transmits network data to and from a private branch exchange (PBX) 109, which is usually connected to multiple telephones (not shown). Additionally, an edge device 111 transmits network data to and from a computer 113. Edge devices can also be connected to a number of different devices and systems including customer premise equipment (CPE) that may include a network in and of itself. An example of an edge device is the Cisco ONS 15327 available from Cisco Systems, Inc., San Jose, Calif.

A new edge device 115 has been recently been added to the network shown in FIG. 1 (as indicated by the dashed lines). Although an edge device is a good example of a network element that can be added to a network and utilize an embodiment of the invention, the invention can be advantageously applied to any network element.

Returning to edge device 115, assume that edge device 115 is a network element that includes new features or is otherwise different than the other network elements on the network. If computer 113 is executing the network management application, conventional techniques may require the network management application to be updated in order for the application to manage the new features of edge device 115. With embodiments of the invention, the network management application does not need to be updated in order to manage edge device 115 including the new features.

Figure 2:
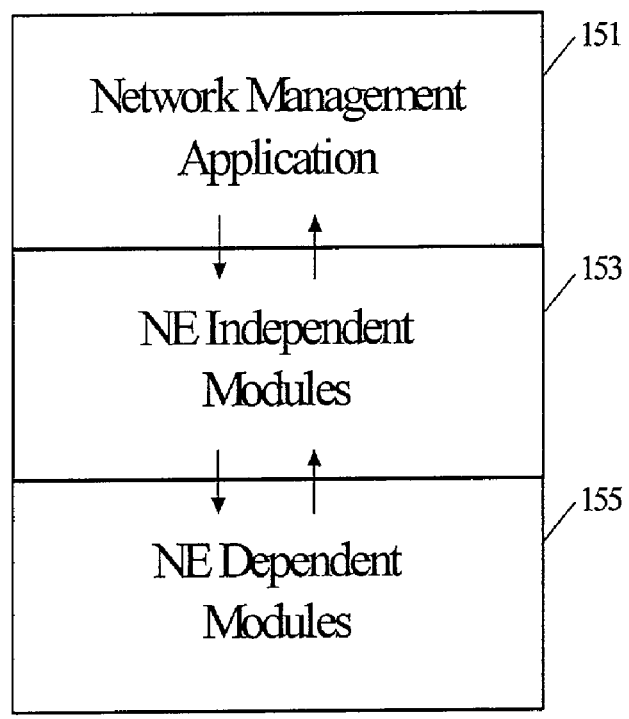
FIG. 2 shows a block diagram of a network management application in communication with network element independent modules and network element dependent modules.

FIG. 2 shows an example of an embodiment of the invention. A network management application 151 is in communication with network element independent modules 153. Network management application 151 provides the high-level user interface for managing the network elements in the network. Network element independent modules provide functions for managing different types of network elements. In other words, the functions provided by network elements independent modules 153 are generic to the network element type.

Network element independent modules 153 are in communication with network element dependent modules 155. Network element dependent modules 155 provide functions that support both network element dependent functionality and network element dependent communication protocols (e.g., one could use Common Object Request Broker Architecture or CORBA, another Simple Network Management Protocol or SNMP, another Transaction Language 1 or TL1, etc.). In preferred embodiments, network element dependent modules 155 are stored on the network element so that the network management application can readily access the modules. The network element dependent module does not have to be deployed via the network element; it is just one example of where it can be deployed. The functions of the network element dependent module can be executed at run time through dynamic class loading.

Figure 3:
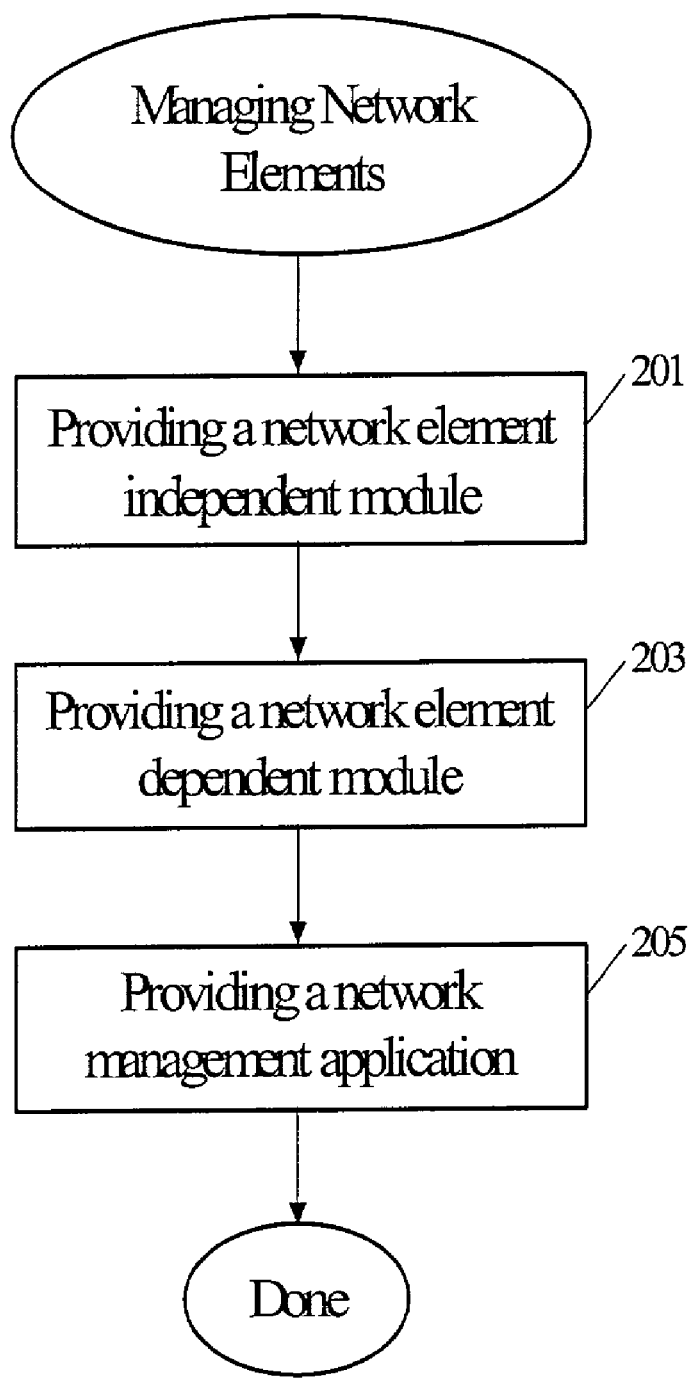
FIG. 3 shows a flow chart of a process of managing network elements in a network.

Accordingly, FIG. 3 shows a flow chart of a process of managing network elements in a network. At a step 201, a network element independent module is provided that includes functions for managing different types of network elements. A network element dependent module is provided that includes functions for managing a specific type of network element at a step 203. Additionally, at a step 205, a network management application is provided that calls the functions of the network element independent and dependent modules to manage multiple network elements in the network. The following paragraphs will describe the interaction of the network management application and the network element independent and dependent modules in one embodiment.

Figure 4:
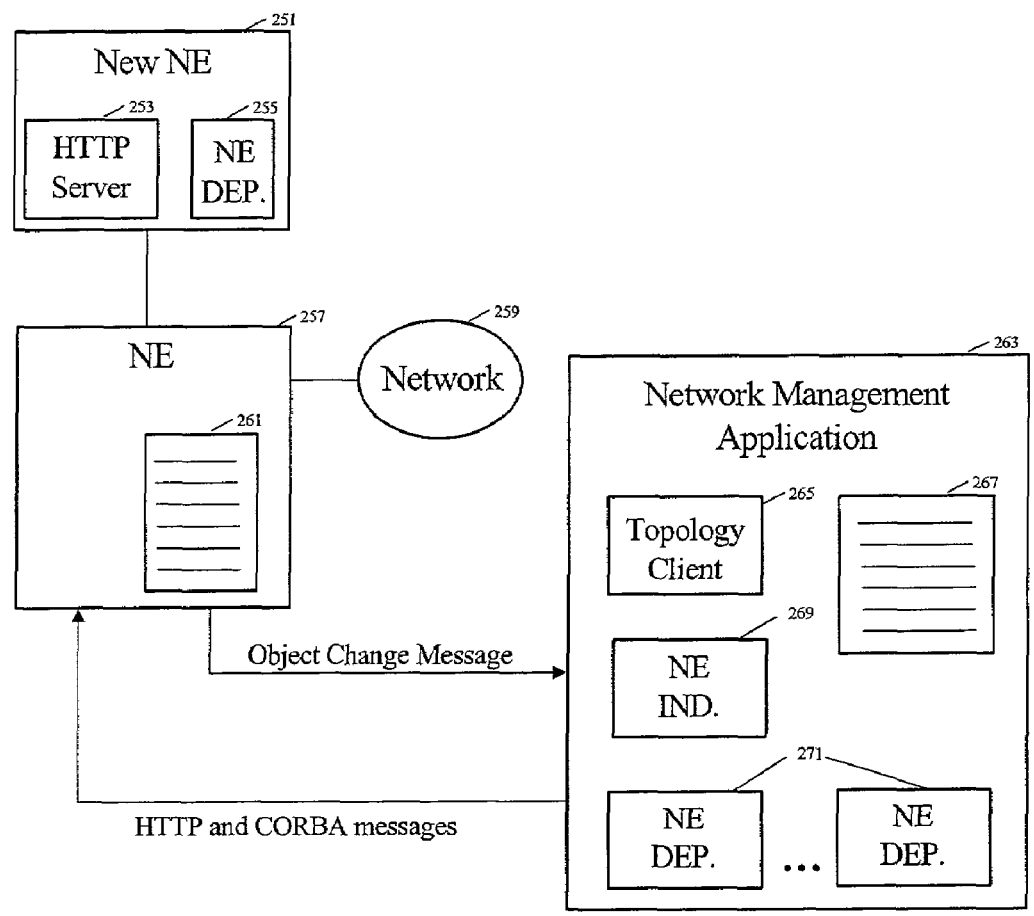
FIG. 4 shows a block diagram of a new network element being added to a network and a network management application being able to manage the new network element.

FIG. 4 shows a new network element added to a network and the interaction with the network management application. A network element 251 has been added to a network. Network elements typically include a processor and a computer readable medium (e.g., memory, flash memory, hard disks, and the like) that store computer code and data. Although new network element 251 typically will include many software applications and modules, the new network element is shown including an HTTP server 253 and a network element dependent module 255.

New network element 251 is shown connected to a network element 257, which is shown connected to the remaining network 259. When new network element 251 is connected and functioning, the new network element will be added to the network. For example, with the open shortest path first (OSPF) routing algorithm, new network element 251 would send hello packets to its neighbors, such as network element 257. Network element 257 would then respond by sending hello packets of its own to new network element 251. The OSPF routing algorithm allows network elements to obtain information about their neighbors.

Network element 257 would store information including the Internet Protocol (IP) address of new network element 251 in a table 261. Table 261 stores information regarding all the network elements of which network element 257 is aware.

Because network element 257 has discovered a new network element, network element 257 issues an object change message on the network that announces that there is a new network element. A network management application 263 is shown including a topology client 265. Topology client 265 listens to the network traffic in order to receive and process object change messages.

Once topology client 265 receives a topology-related object change message, information about the new network element is extracted from the network element 257 and stored in a table 267. Table 267 can store information (e.g., IP address) regarding network elements on the network and the shortest path for communicating with the network element.

Once network management application 263 has discovered a new network element such as new network element 251, the network management application can send an HTTP message to new network element 251 requesting further information about the network element. For example, the network management application can request the network element type and the software version. It should be understood that further or different information about the new network element could be requested in other embodiments.

Network management application 263 can initialize a network element independent module 269 for new network element 251. If the network management application receives an HTTP message from new network element 251 that confirms that the type of new network element 251 is the same type as one of the existing network element dependent modules 271 (could be only one), the stored network element dependent module 271 is utilized. Otherwise, network management application 263 sends an HTTP message to new network element 251 requesting network element dependent module 255 for the new network element. HTTP server 253 responds with an HTTP message that transmits network element dependent module 255 to network management application 263.

Once received, network element dependent module 255 is added to the stored element dependent modules 271. In order to create an interface to new network element 251, network element dependent module 255 includes computer code that when executed will generate a common object request broker (CORBA), or other, interface to the new network element.

Once an interface to new network element 251 had been established, network management application 263 can send CORBA messages to the new network element in order to perform Operations, Administration, Maintenance and Provisioning (OAM&P). Additionally, CORBA messages can be sent to new network element 251 in order to control the network element.

Figure 5:
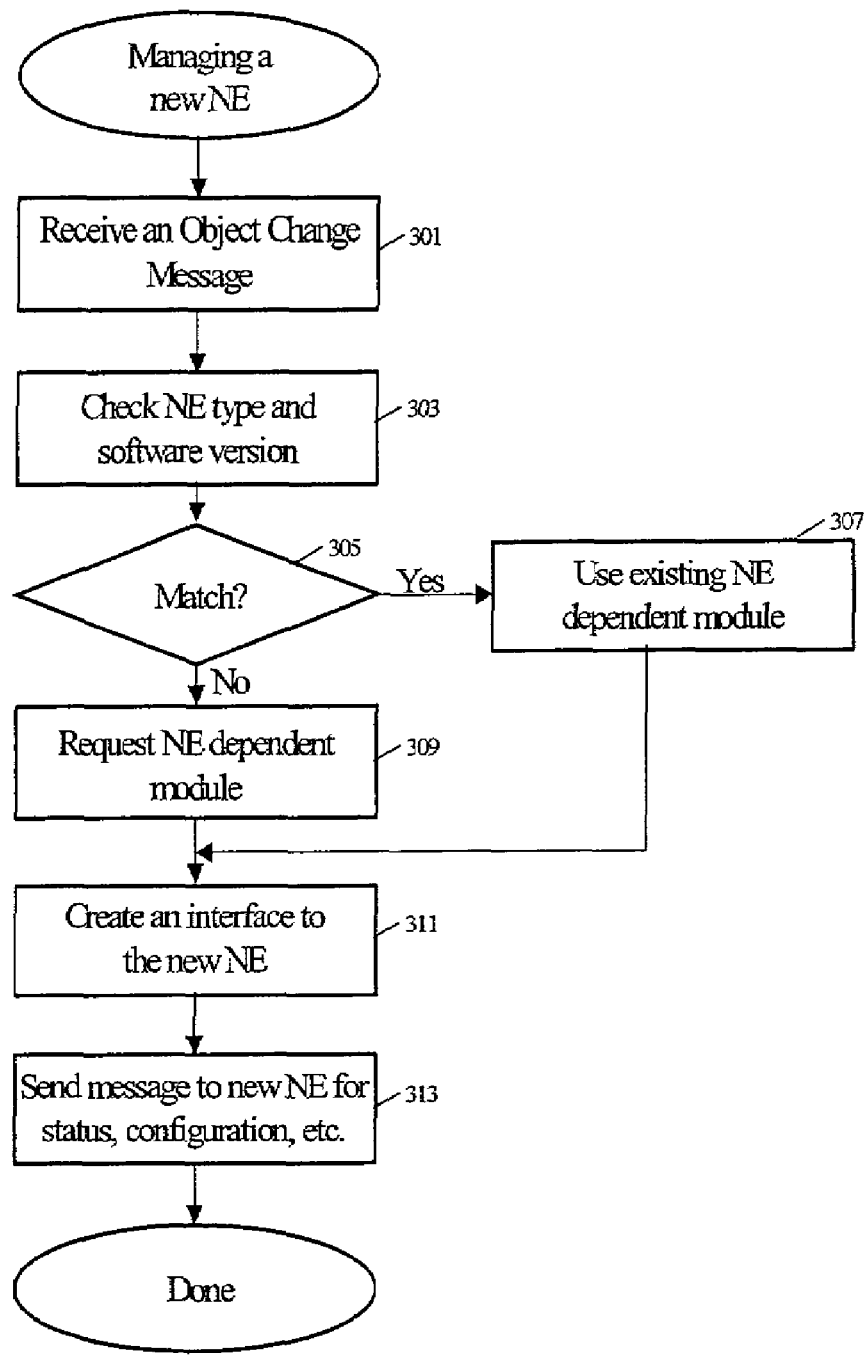
FIG. 5 shows a flow chart of a process of managing a new network element in a network.

As a further example of managing a new network element, FIG. 5 shows a flow chart of a process of managing a new network element in a network. The flow chart shown illustrates steps that can be executed by a network management application in order to manage a new network element.

At a step 301, an object change message is received. The object change message indicates that there is a change in network topology and an update on the topology reveals the address of the new network element. Using the address of the new network element, the network element type and software version are checked at a step 303. Although preferred embodiments utilize the network element type and software version, other embodiments can use either one of these characteristics or include additional characteristics.

If it is determined at a step 305 that the network element type and software version for the new network element match (or are compatible) the network element type and software version of another network element on the network, the existing (or stored) network element dependent module for that network element is used at a step 307. In other words, the specifications for the new network element are known since there is already a network element dependent module for these same network element type and software version.

Otherwise, if the network element type and software version do not match at step 305, the network element dependent module for the new network element is requested at a step 309. At a step 311, the network element dependent module is utilized to create an interface to the new network element. The interface can be used to query the status of the new network element and control or manage the new network element. At a step 313, messages are sent to the new network element for status, configuration and the like.

The network management application uses a graphical user interfaces to assist in managing the network elements in the network. FIGS. 6B and 6C show examples of graphical user interface windows for managing two different network elements, while FIG. 6A shows an example of graphical user interface windows for managing of multiple, heterogeneous network elements at the network level.

Figure 6A:
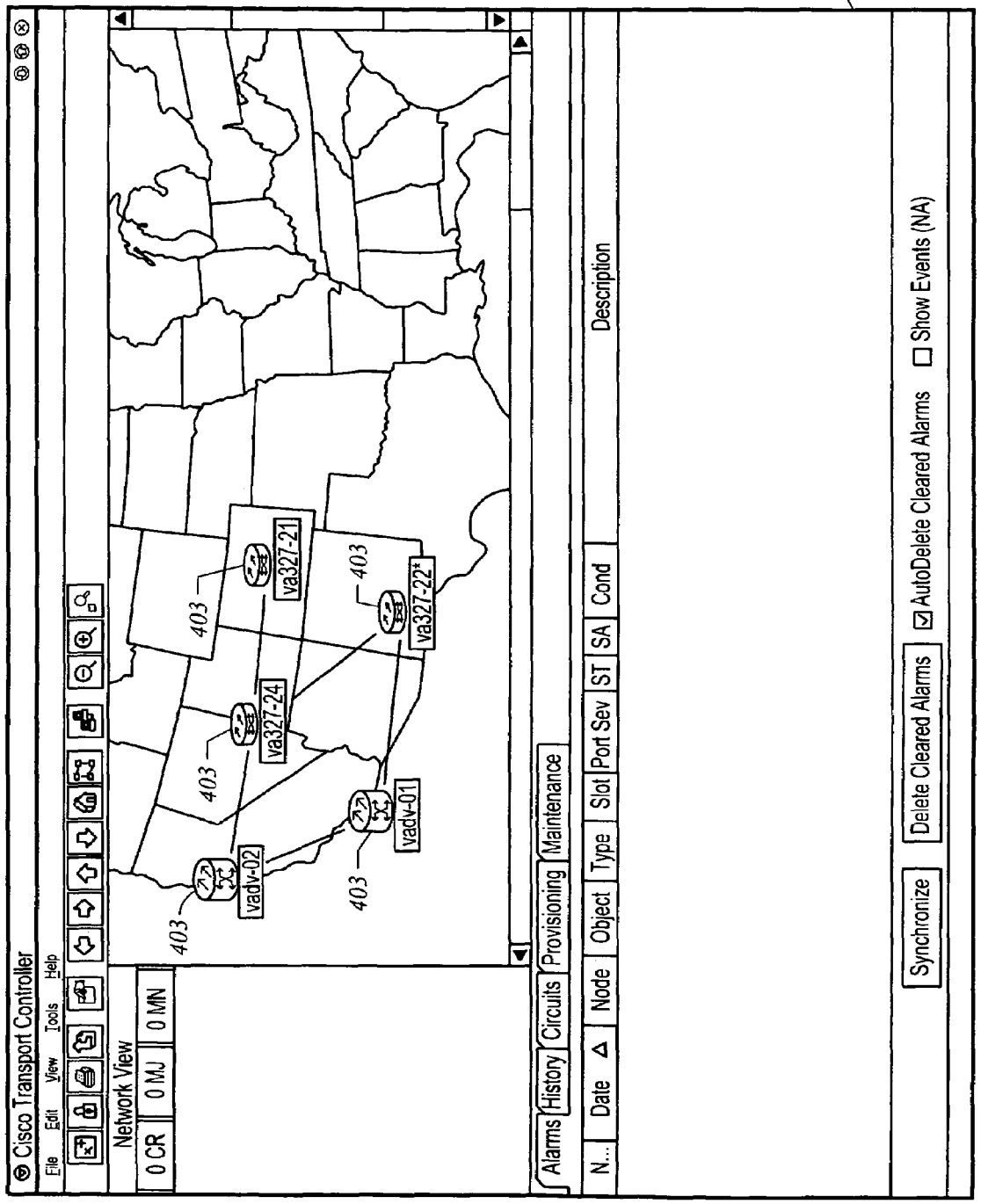
FIGS. 6A, 6B and 6C show examples of graphical user interface windows that can be utilized to manage different types of network elements, whereas specifications for the network elements were obtained through the network element dependent modules.
Figure 6B:
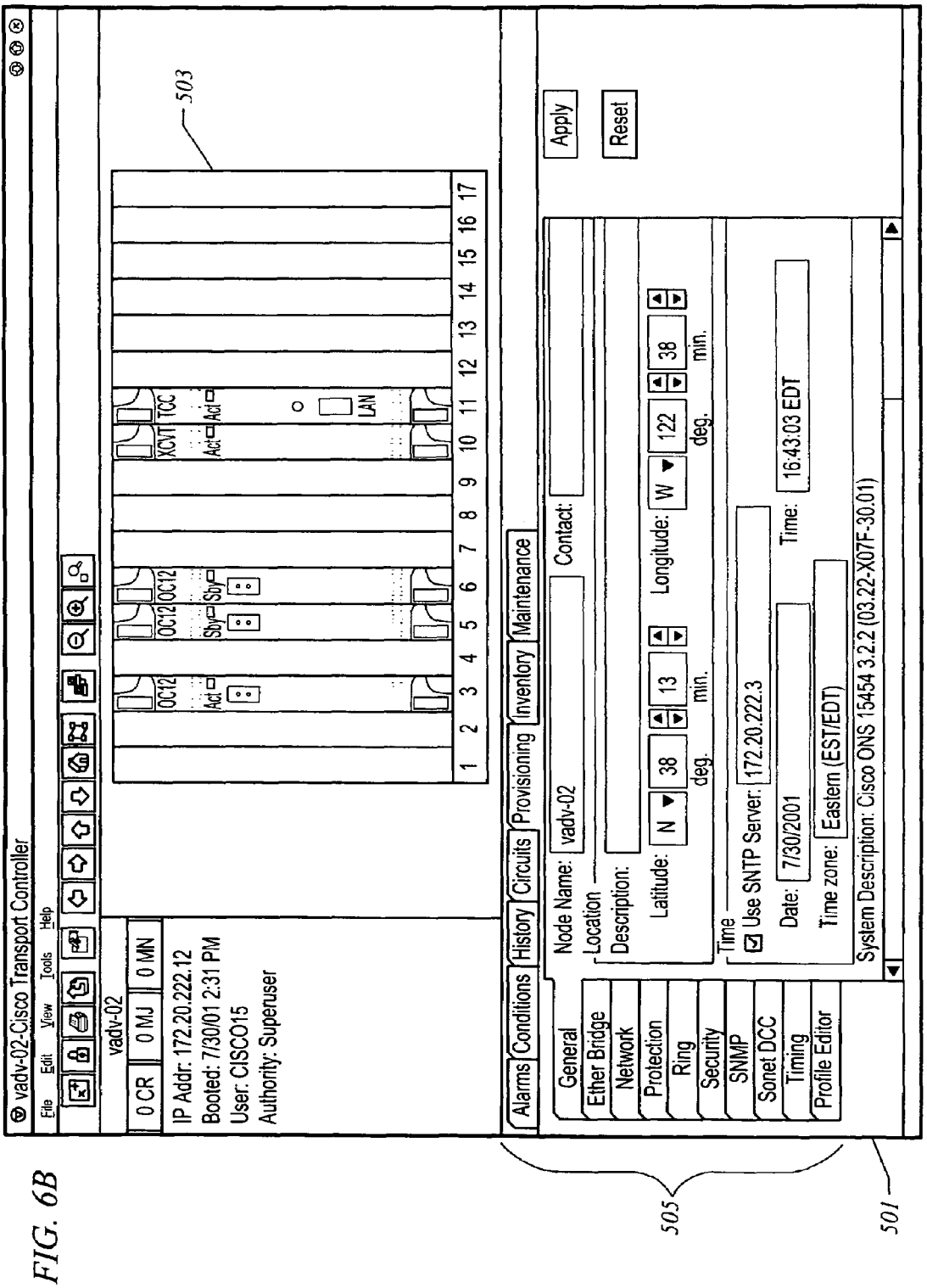
Figure 6C:
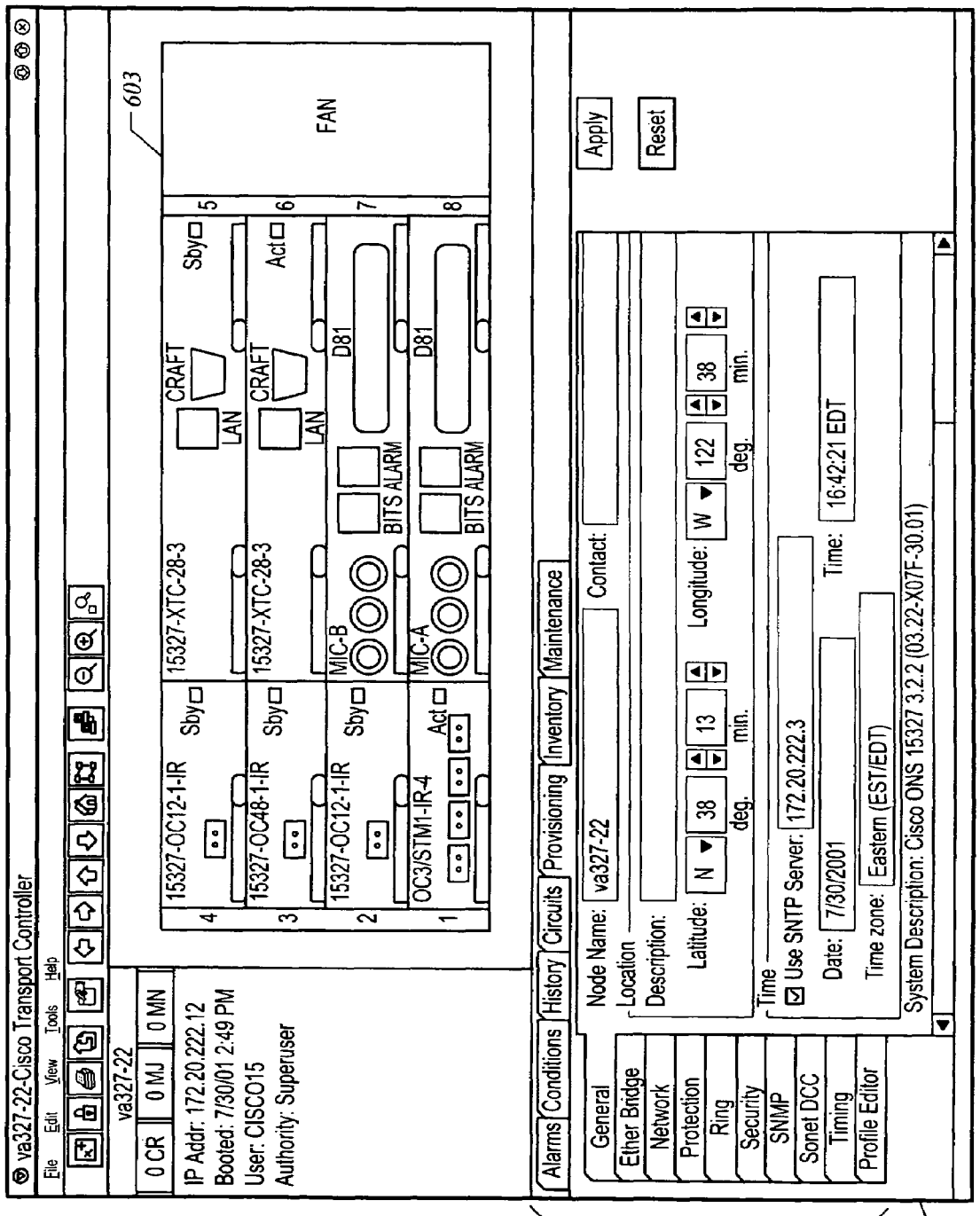

In FIG. 6A, a window 401 is shown for managing multiple network elements 403 within a network. The network element independent module contains instructions for managing the generic functionality of all network elements. In addition, this element independent module provides the ability to drill-down into individual network elements where control is delegated to a specific element dependent module.

In FIG. 6B, a window 501 is shown for managing a network element. The network element dependent module can include specifications for the network element. Such specifications can include a graphical representation of the network element. A graphical image 503 depicts the actual layout of the network element. As shown, there are seventeen vertical banks for inserting cards into the network element. Additionally, tabs 505 allow the user to access features for the network element. Tabs 505 can pertain to network element independent features and/or network element dependent features, from the respective module.

In FIG. 6C, a window 601 is shown that allows a user to manage a network element that is different from the one shown in FIG. 6B. A graphical image 603 shows that the network element includes connections for multiple horizontal cards. When the status of the network element is determined, graphical image 603 can be updated and modified to reflect the actual cards that are in the network element. Features of the network element including network element independent features and network element dependent features can be accessed using tabs 605.

While the above is a complete description of preferred embodiments of the invention, various alternatives, modifications, and equivalents can be used. It should be evident that the invention is equally applicable by making appropriate modifications to the embodiments described above. Therefore, the above description should not be taken as limiting the scope of the invention that is defined by the metes and bounds of the appended claims along with their full scope of equivalents.

What is claimed is:

1. A method of managing network elements in an optical network at a node in the network, comprising:

providing a network element independent module that includes functions for managing different types of network elements;

providing one or more network element dependent modules that include functions for managing a specific type of network element and is in communication with the network element independent module;

providing a network management application that is in communication with the network element independent module and calls the functions of the network element independent and dependent modules to manage a plurality of network elements in a network;

receiving at the node a message indicating that there is a new network element in the network;

sending a request to the new network element for information about the new network element;

initializing the network element independent module for the new network element;

determining if the new network element corresponds to one of the network element dependent modules accessible by the network management application;

utilizing one of the network element dependent modules to manage the new network element if the new network element corresponds to one of the network element dependent modules accessible by the network management application; and receiving from the new network element and storing a new network element dependent module if the new network element does not correspond to one of the network element dependent modules accessible by the network management application;

wherein the new network element dependent module, network element independent module, and network management application are stored at the node so that the node is operable to communicate directly with the new network element.

2. The method of claim 1, wherein the functions of the network element dependent module are executable at run time through dynamic class loading.

3. The method of claim 1, wherein the network element dependent module includes specifications of the network element.

4. The method of claim 3, wherein the specifications include a graphical representation of the network element.

5. The method of claim 1 further comprising receiving a message indicating a topology change in said network and identifying said new network element.

6. The method of claim 1 wherein the network element dependent module comprises functions that support network element dependent communication protocols.

7. The method of claim 6 wherein the network element dependent communication protocols are management protocols.

8. The method of claim 1 wherein sending a request for information about the new network element comprises sending an HTTP message.

9. The method of claim 1 wherein the node is a network management node configured for managing said plurality of network elements in the network and the new network element is an edge device in communication with a metro network element.

10. The method of claim 1 wherein receiving a message indicating that there is a new network element in the network comprises listening to network traffic and receiving a topology-related object change message identifying the new network element.

11. The method of claim 10 further comprising extracting information about the new network element from the object change message and storing said information along with a shortest path for communicating with the new network element.

12. The method of claim 1 wherein receiving and storing a new network element dependent module further comprises creating an interface to the new network element.

13. A method of managing network elements in an optical network at a node in the network, comprising:
  receiving at the node a message indicating that there is a new network element in the network;
  sending a request to the new network element for the specific type of the network element;
  determining if the new network element is compatible with a specific type of another network element on the network;
  if the specific type of the network element is compatible with the specific type of another network element on the network, utilizing a stored network element dependent module;
  if the specific type of the network element is not compatible with the specific type of another network element on the network:
    sending a request to the new network element for a network element dependent module that includes functions for managing the specific type of the network element;
    executing the network element dependent module to create an interface to the network element; and
    utilizing the interface to manage the network element;
    wherein the network element dependent module is executed at the same node running a network management application.

14. The method of claim 13, further comprising sending a request to the network element for the software version of the network element.

15. The method of claim 13, further comprising receiving an object change message that there is a new network element on the network.

16. A computer-readable storage medium encoded with a computer program for managing network elements at a network management node in a network, the network comprising a plurality of network elements including one or more edge devices, the computer program comprising:
  code that operates an element independent module including functions for managing different type of network elements in the network;
  code that operates one or more network element dependent module that support network element dependent functions and network element dependent communication protocols;
  code that operates a network management application in communication with the network element independent module and operable to call the functions of the network element independent and dependent modules to manage said plurality of network elements in the network;
  code that receives at the network management node an object change message indicating that there is a topology change in the network and identifying a new network element;
  code that stores information on said plurality of network elements and the new network element including path information for communicating with the network elements;
  code that sends a request to the new network element for information about the new network element;
  code that initializes the network element independent module for the new network element;
  code that determines if the new network element corresponds to one of the network element dependent modules accessible by the network management application;
  code that utilizes one of the network element dependent modules to manage the new network element if the new network element corresponds to one of the network element dependent modules accessible by the network management application; and
  code that receives from the new network element and stores a new network element dependent module if the new network element does not correspond to one of the network element dependent modules accessible by the network management application;
  wherein the new network element dependent module, network element independent module, and network management application are stored at the network management node so that the node is operable to communicate directly with the new network element.

17. The computer-readable storage medium of claim 16 wherein the functions of the network element dependent module are executable at run time through dynamic class loading.

18. The computer-readable storage medium of claim 16 wherein the network element dependent module includes specifications of the network element.

19. The computer-readable storage medium of claim 18 wherein the specifications include a graphical representation of the network elements.

20. The computer-readable storage medium of claim 16 wherein sending a request for information about the new network element comprises sending an HTTP message.

21. The computer-readable storage medium of claim 16 wherein code that receives and stores a new network element dependent module comprises code that generates a common object request broker interface to the new network element.

* * * * *